July 31, 1934.   O. NEISS   1,968,346
METHOD OF PRODUCING AN UNSYMMETRICAL ALTERNATING VOLTAGE
Filed Nov. 12, 1930   2 Sheets-Sheet 1

Patented July 31, 1934

1,968,346

UNITED STATES PATENT OFFICE 1,968,346

METHOD OF PRODUCING AN UNSYMMETRICAL ALTERNATING VOLTAGE

Oskar Neiss, Hamburg, Germany

Application November 12, 1930, Serial No. 495,271
In Germany March 26, 1930

5 Claims. (Cl. 175—363)

My invention relates to a method of producing an unsymmetrical alternating voltage by means of a superimposed magnetization by direct current.

If a rectified magnetic flux is superimposed on a sinusoidal alternating flux, the curve form may deviate considerably from the original shape. In all these cases it is a question of shifting the hysteresis loop to the zero line, that is, strengthening the magnetic reluctance in one direction and weakening it in the other. This well-known method is used to develop harmonics higher than the fundamental wave. Although it is possible by doing this, to shift the peak values of both voltage half-waves to their zero or neutral point, their amplitudes are equal in shape and magnitude. Such a voltage wave will therefore always produce an alternating current which is symmetrical in every respect and possibly of higher frequency. In order to generate alternating currents whose peak values are different with respect to the zero line, it has already been proposed to superimpose on the alternating current, one of equal phase taken from a full-wave rectifier, so that this current amplifies the simple alternating current in one half wave, but attenuates in the other, so that their peak values are as 1:2 in the most favourable case. This process assumes that the double period current is in a fixed relation to the total effective current. The double period current thus participates considerably in the transmission of energy. This method is however unsuitable, as its realization with simple means is impossible when there is phase coincidence with the fundamental wave.

Further it is well known to control a current which is per se, sinusoidal, by passing it through a choke which is magnetized by direct current. In this case the inductivity of the choke is greater in one direction and smaller in the other, so that current waves of different amplitudes may arise. With these well-known means however, whilst probably the currents may be controlled, yet it is not possible to induce in an open winding, an alternating voltage whose peak values in the two half-waves are different with respect to the zero line. Such voltage curves could only be attained hitherto in resonance systems, oscillatory circuits, with the aid of negative resistances, but for greater transmissions of power or for high intensities of current, these do not come into account.

The invention aims at producing these unsymmetrical voltages with a unilateral peak value, namely as a no-load voltage. Voltages with such a curve shape are much in use in actual practice, especially where it is a question of obtaining the highest possible potential without a large expenditure of power. For example, in testing for insulating strength, voltages of high peak value are used without a flow of current taking place. Further, many electro-static operations are successfully carried out with a voltage curve of such form, for example in many chemical processes.

The invention is not limited to the production of a voltage distortion in the no-load condition but permits it also in dependence on the current in the same circuit.

In the first case the electro-motive force from the source of current experiences a distortion, in the second case it is the current which is produced when this circuit is closed.

The invention may be realized by producing a direct current magnetization from the main current itself, or from its direct-current components apart from the superimposed shunt magnetization. This may be brought about by the main and shunt winding being connected together to a compound winding and by making the percentage saturation component of the shunt winding so small that self-excitation through the main current is not possible. Magnetization by direct current may also be brought about by a main current coil alone—through adding a direct current component in the main current—or by the output device itself or by additional means.

Thus it is possible according to the invention to produce a self-exciting transformer with a main current characteristic, for taking direct current straight from an induced secondary winding.

The invention will now be explained, by way of example, with the aid of the accompanying drawings.

Figure 1:
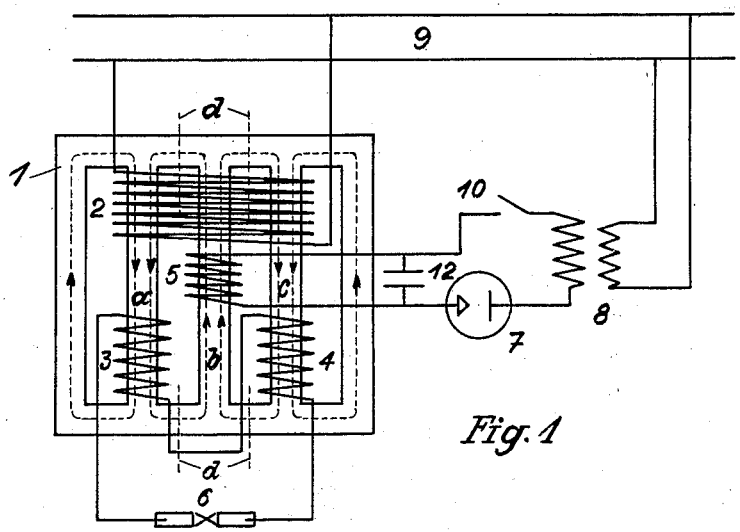
Fig. 1 is a practical embodiment shown schematically.

The transformer core 1 comprises five limbs, of which the center ones $a$, $b$ and $c$ are wound with coils. A primary coil 2 which is fed from the alternating current mains 9, at the usual supply frequency of 50 periods and with sinusoidal current, produces a flux which flows through all the limbs $a$, $b$ and $c$ and closes the magnetic circuit through the outer limbs. The secondary coils 3 and 4 on the limbs $a$ and $c$ are therefore inductively affected. As they are connected together in series with their windings in the same direction, it is possible to measure an alternating potential at their ends, corresponding to the transformer ratio with respect to the primary winding 2, this alternating potential having exactly the same property as the mains voltage, possibly differing with respect to the magnetic saturation of the limbs on which they are placed. Similarly the winding 5 on the limb $b$ is inductively affected. When its circuit is closed at 10, a flow of current may be produced in it through the rectifier 7, which in well-known manner is associated with the alternating current mains, through a transformer 8. Phase coincidence thus exists between its pulsating direct current supplied to the coil 5 and the alternating current flowing in the coil 2.

When it is a case of half-wave rectification, the coil 5 sends magnetic impulses through the limbs $a$, $b$ and $c$, as shown in Fig. 1. Thus a magnetic interlinking takes place between the alternating circuit and the rectified circuit, as is the case with the limbs $a$, $b$ and $c$ according to Fig. 1. Thus in each plus half-wave of the alternating current, a superimposition takes place through a full period, resulting from the half-wave rectifier effect. Phase coincidence exists between these two magnetizing components as their magnetizing currents are derived from the same network. A superimposition of this kind gives the coils 3 and 4, Fig. 1, a resultant flux with a steep front (saw-tooth shape). Seeing that according to the law of induction, the instantaneous value of the electro-motive force is a function of the speed of change of the flux with respect to time, we get the voltage curve of Fig. 2, which it is the object of the invention to attain.

The superimposing of direct current must be a half-wave rectification and must be in phase with the primary current. In order to bring this about, it is necessary to take the direct current from the supply network separately. As the energizing coil 5 of the primary coil 2 is inductively affected, it supplies the electro-motive force for the rectifier itself. It is the secondary winding to the primary coil 2; hence there exists between them a magnetic stray which disturbs phase coincidence. This phase displacement is compensated by the condenser 12, Fig. 1.

In order to obtain the effect intended, it is important that both superposing fluxes are in the correct relation to each other. This relation is dependent on the magnetic saturation which prevails in the limbs $a$, $b$ and $c$.

Figure 3:
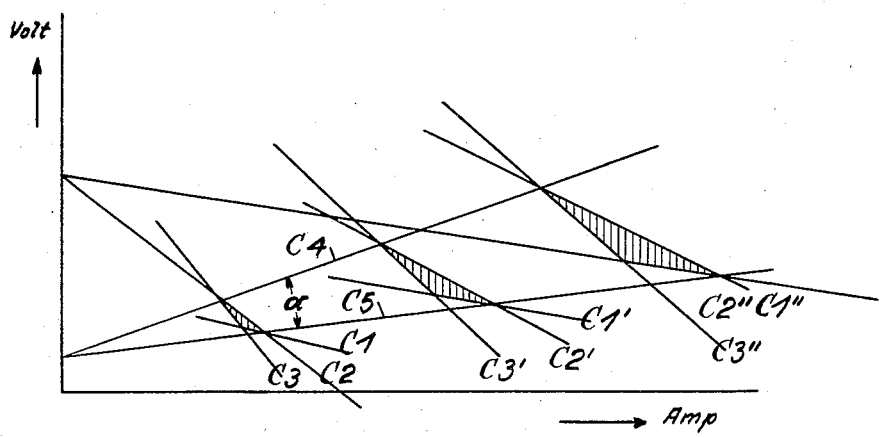
Fig. 3 illustrates the current-voltage characteristic of the transformer.

If the direct current is broken at 10, Fig. 1 and the system considered first of all as a normal transformer, we get the following arrangement. An output device, say an ohmic resistance is applied to the ends of the coils 3 and 4, thus producing a closed alternating current circuit. The current-voltage characteristic may now be determined with this resistance. It is shown by Fig. 3. A certain input voltage at the primary coil 2 corresponds to a certain magnetic saturation in the limbs $a$, $b$ and $c$ and a certain secondary voltage at the ends of the coils 3 and 4. The recorded characteristic might correspond to curve $C_1$. If the secondary voltage is altered by increasing the number of turns of the coils 3 and 4, the characteristic runs steeper, say according to curve $C_2$, curve $C_3$ and so on. Hence it follows that with a rising secondary voltage and constant primary conditions the short circuit current intensity decreases, but the characteristics themselves are straight. The course of these effects is opposite to that in a normal transformer, because two characteristics can never cross in any point here.

If the primary voltage is raised at the coil 2, the saturation in the limbs $a$, $b$ and $c$ thereby increases, and the secondary voltage in the coils 3 and 4. In this case, the characteristic $C_1$ corresponds to that under the first conditions 1. If the primary voltage is further increased at the coil 2, the curves $C_{1''}$, $C_{2''}$, $C_{3''}$ are obtained. The curves $C_2$ and $C_{1''}$ have the same no-load voltage; the course of the curves is however quite different.

According to the invention, the relations of the curves $C_1$, $C_2$ and $C_3$ are the most favourable for producing the unsymmetrical voltage. The reduction of power in the curve 2 as compared with the curve $C_{1''}$ is however very considerable, notwithstanding the fact that they have the same no-load voltage.

The yield of power from the arrangement is determined by the ratio of the iron cross-sections of the limb $b$ with respect to the limbs $a$ and $c$. A thinning of the limb $b$ means an increase of power, but bad distortion of the secondary voltage and vice versa. A transformer according to the curve $C_1$, $C_2$ or $C_3$ will therefore have a greater weight per kilowatt than a transformer according to the curve $C_{1''}$, $C_{2''}$ and $C_{3''}$. The curves $C_1$, $C_2$ and $C_3$ or $C_{1'}$, $C_{2'}$ and $C_{3'}$ intersect each other and form triangles. The lines joining the points of intersection of the triangle are straight lines $C_4$ and $C_5$ which form an angle $\alpha$. According to the invention, whilst the weight per kilowatt of power is a minimum, the most satisfactory voltage distortion will be attained according to Fig. 2 when the maximum saturation in the limb $b$ gives a maximum angle $\alpha$ with the least voltage drop. The condition of maximum saturation may be regulated by means of the coil 5, causing the direct current to flow with greater or less intensity.

The iron of the transformer is separated at $d$, Fig. 1, so that a magnetic interlinking between the limb $b$ on the one hand and the limbs $a$ and $c$ on the other hand, is avoided, whilst the limb $b$ is provided with a separate return thus distorting the flux lines. Hence there exist two separate magnetic and electric circuits. A superimposition of the two fluxes can no longer take place. Consequently, the secondary voltage at the coils 3 and 4 also differs but slightly from the fundamental form. It is true that in the no-load period, the primary current is slightly distorted, but the system acts as though the limb $b$, magnetized by direct current, did not exist. If the output device 6 takes the form of an ohmic resistance applied to the secondary voltage of the coils 3 and 4, the current flowing through it will be distorted considerably, in such a way that a peak value is greater in one direction than the other. The process is thus started by the action of the secondary ampere turns. They react on the primary windings 2, which in turn affect the magnetizing turns of the coil 5, so that a reflection may take place among these three groups of coils. Whilst it has been successfully attempted to use for magnetizing, a current which was taken from a full-wave rectifier, and appreciably smoothed by the self-inductance of the coil 5, nevertheless the rectified current in every other one of its half-waves was so amplified by the reflection of the primary windings, that the magnetizing current appeared to be composed of a constant direct current and a half-wave direct current.

Figure 2:
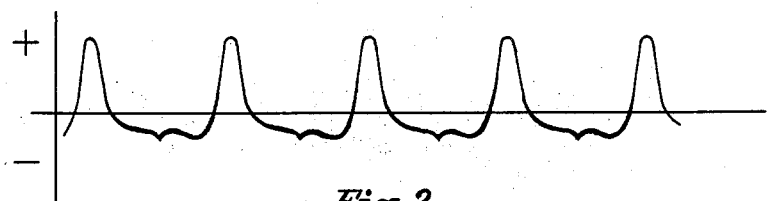
Fig. 2 is the recorded oscillogram of the electromotive force.

If a current corresponding to this arrangement or a voltage according to Fig. 2 be applied to an output device, for example an electric arc, such as used for electric welding, for operating an electric arc furnace or for all cases in which it is a question of the passage of electricity through a gaseous substance with an anode and cathode drop, rectification will take place. The current flows only in the positive direction, because owing to the small voltage drop no striking of the arc can take place in the negative portion.

When carrying out an actual test for instance, the magnetizing power of the rectifier was 0.2 amps.×15 volts=3 watts whilst the D. C. energy at the electric arc, as an output device, was 4 amps.×40 volts=160 watts. Thus according to the invention, it is possible to create direct currents of any magnitude in the manner described, particularly in such cases where the electric arc burning in the free atmosphere is used for thermic purposes and further where the rectification of such high currents for these purposes presents difficulties. The superiority of direct current on account of the heat conditions of its polarities is well known.

Figure 4:
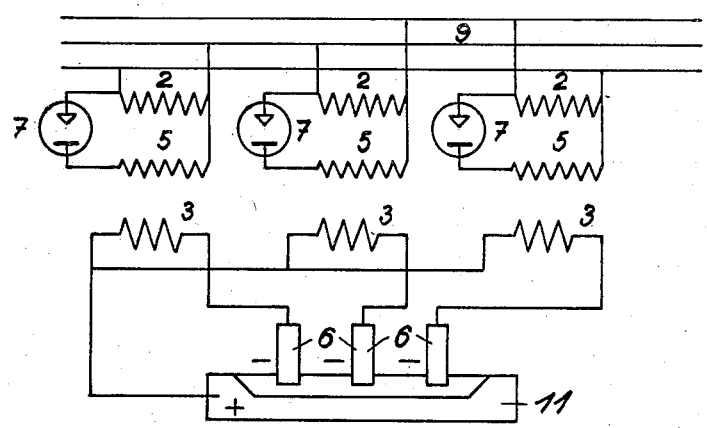
Fig. 4 is a schematic representation of the invention as applied to an electric arc furnace.
Figure 5:
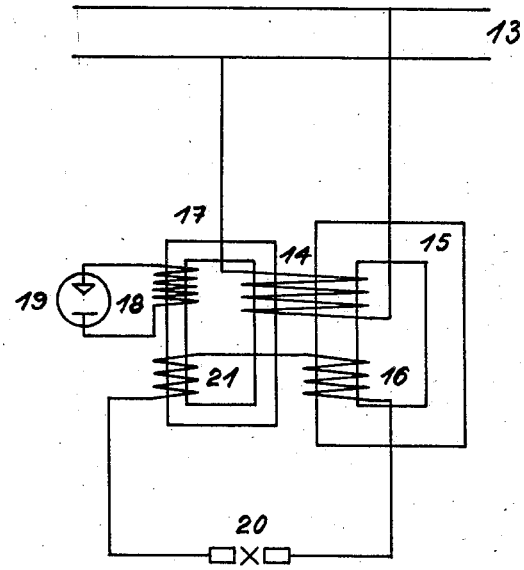
Fig. 5 is a schematic representation of an embodiment with main and shunt magnetization.

When applying the invention to an electric arc furnace (Fig. 4) three arrangements of the kind described, are supplied from a three-phase network 9. The voltage of the secondary windings 3 has the voltage curve as in Fig. 2 or the devices are arranged according to the un-linked system. The voltages are displaced with respect to each other by 120 degrees each. Now if the secondary windings are connected together to a star circuit and the neutral point connected as the plus pole to the bath 11, a direct current flows in each phase, due to the rectification of the arc, an action which is well known in connection with any mercury vapour rectifier. Due to the fact that the electrodes are connected to the minus pole, the burning away of same is reduced considerably and the generation of heat at the electrodes is diminished appreciably.

In the case of main and shunt magnetization, the alternating current network 13 feeds a primary winding 14, which energizes a magnetic circuit 15 with a secondary winding 16 and furthermore a magnetic circuit 17 with a winding 18. This winding is closed through a rectifier 19, so that direct current magnetization prevails in the circuit 17. The output device 20 then has a distorted current curve with unequal peak values. When electric arcs are used in the output, a rectifying effect occurs owing to the anode and cathode drop.

Now seeing that the rectifying action is dependent on the amount of saturation in the circuit 17, the power of the direct current magnetization also increases with the output of the device. Just as is the case with a pure shunt dynamo, this may assume uneconomical forms.

According to the invention, compounding takes place, i. e. the direct current produced at the output device is passed through a main current coil, which is able to attenuate or strengthen the effect of the coil 18. Tests have shown that only a very weak direct current need flow through the coil 18 in order to cause a scarcely noticeable distortion at the output device 20. This distortion is sufficient to produce a direct current component which intensifies the direct current magnetization in the circuit 17 through the main current coil 21.

Just as is the case with a series wound motor using direct current, the transformer excites itself. Further it has been found that such an exceedingly small magnetization of the coil 18 is sufficient to bring about self-excitation through the main current coil 21. This means a considerable economic advantage, because large units of power thereby become possible without having to increase the ampere turns of the coil 18 unduly. The percentage saturation component in the circuit 17 of the exciting winding of the main current coil, may be 1% and less.

The effect of the main current coil may also be reversed by an opposite connection to the exciting coil, i. e. a counter-compounding takes place. Compounding intensifies the main current, counter-compounding weakens it.

An advantageous effect of the main current coil is that it smooths the pulsating direct current at the output device 20 owing to its inductive character, as is done by means of chokes in mercury vapour rectifiers.

As the slightest pre-magnetization through the shunt coil 18 is sufficient to allow self-excitation to take place through the main current coil 21, this condition may also occur, according to the invention, by dispensing entirely with the shunt coil in the following manner.

When the main current coil commences its action, the effect of this coil 21, may be attributed only to a small direct current component, as the distortion of the voltage at the output device is only slightly different from the alternating current form, owing to the slight direct current saturation in the circuit 17. Due to the increasing effect of the main current coil, the direct current component develops itself increasingly, becoming 100% when saturation is reached and the state of equilibrium is attained.

The shunt coil 18 thus fulfils the purpose of maintaining permanently a slight unbalance at the output device 20. It is well known to produce these unbalances in electric arcs burning in the open atmosphere, if the two electrodes are of different thickness, composition, shape or material, e. g., carbon-iron. Nevertheless, this lack of symmetry of the current, which can be demonstrated by oscillographic methods, is sufficient to enable the direct current component through a main current winding to be utilized in the circuit 17 in such a way, that a constantly increasing magnetization takes place.

A further sphere of application is electric arc welding. In this case, the expensive motor generator, otherwise essential, is replaced by a light and inexpensive transformer. Direct current is much more suitable for electric arc welding.

I claim:

1. That method of producing an unsymmetrical alternating current which consists in utilizing a symmetrical alternating current to produce a symmetrical magnetic flux alternating in half waves, rectifying a portion of said alternating current, utilizing the rectified current to produce a unidirectional magnetic flux having a period equal to the full period of the alternating magnetic flux and substantially in phase therewith, and impressing said unidirectional flux on the alternating flux, utilizing the resultant magnetic flux to induce an electric current.

2. In an apparatus of the kind described, the combination with a source of supply of alternating current, of a transformer having a core of magnetic material and a primary winding, conductive connections between the source of supply and said primary winding, a secondary winding on said core having output leads extending therefrom, a further winding on said core, and a source of unidirectional current impulses connected to the last mentioned winding, said direct current being substantially in phase with and having the same periodicity as the alternating current.

3. In an apparatus of the kind described, the combination with a source of supply of alternating current, of a transformer having a core of magnetic material and a primary winding, conductive connections between the source of supply and said primary winding, a secondary winding on said core having output leads extending therefrom, a further winding on said core, and means for connecting the last mentioned winding to the source of alternating current and including current rectifying means arranged to convert the alternating current to unidirectional current impulses substantially in phase with and having substantially the same periodicity as the alternating current, said secondary winding being free from conductive connection with said further winding.

4. In apparatus of the kind described, the combination with a source of supply of alternating current, of a transformer having a core of magnetic material and a primary winding, conductive connections between the source of supply and said primary winding, a secondary winding on said core having output leads extending therefrom, a further winding on said core, a second transformer having a primary winding receiving current from the said source, said second transformer having a secondary winding having its terminals connected to the last mentioned core winding, and a rectifier interposed in the last mentioned connection arranged to convert the alternating current to unidirectional current impulses substantially in phase with and having substantially the same periodicity as the alternating current, said secondary winding being free from conductive connection with said further winding.

5. In an apparatus of the kind described, the combination with a source of supply of alternating current, of a transformer having a core of magnetic material and a primary winding, conductive connections between the source of supply and said primary winding, a secondary winding on said core having output leads extending therefrom, a further winding on said core, a second transformer having a primary winding receiving current from said source, said second transformer having a secondary winding having its terminals connected to the last mentioned core winding, a rectifier interposed in the last mentioned connection arranged to convert the alternating current to unidirectional current impulses substantially in phase with and having substantially the same periodicity as the alternating current, said secondary winding being free from conductive connection with said further winding, and a condenser bridged across the last mentioned connection between the rectifier and the core winding connected thereto.

OSKAR NEISS.